US012218470B2

(12) United States Patent
Chadbourne

(10) Patent No.: US 12,218,470 B2
(45) **Date of Patent: *Feb. 4, 2025**

(54) INSULATION PIERCING WEDGE CONNECTOR

(71) Applicant: Hubbell Incorporated, Shelton, CT (US)

(72) Inventor: Christopher Gilpin Chadbourne, Merrimack, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,685

(22) Filed: Nov. 30, 2023

(65) Prior Publication Data

US 2024/0106136 A1 Mar. 28, 2024

Related U.S. Application Data

(63) Continuation of application No. 17/684,934, filed on Mar. 2, 2022, now Pat. No. 11,843,211.

(60) Provisional application No. 63/155,431, filed on Mar. 2, 2021.

(51) Int. Cl.

| | |
|---|---|
| ***H01R 4/24*** | (2018.01) |
| ***H01R 4/2412*** | (2018.01) |
| ***H01R 4/2495*** | (2018.01) |

(52) U.S. Cl.

CPC ......... *H01R 4/2412* (2013.01); *H01R 4/2495* (2013.01)

(58) Field of Classification Search

CPC ...... H01R 4/24; H01R 4/2412; H01R 4/2495; H01R 4/50; H01R 11/01; H01R 11/20; H01R 4/00

USPC ................... 174/74 R, 78, 84 R, 84 C, 88 R; 439/783–785, 790, 863, 433, 435, 436, 439/425, 429, 393, 417, 413, 426

See application file for complete search history.

(56) References Cited

U.S. PATENT DOCUMENTS

| | | | | | |
|---|---|---|---|---|---|
| 3,329,928 | A * | 7/1967 | Broske | H01R 4/08 | 439/783 |
| 3,811,105 | A * | 5/1974 | Gerhard | H01R 4/2491 | 439/417 |
| 5,842,893 | A * | 12/1998 | De Keyser | H01R 4/2412 | 439/783 |
| 5,862,589 | A | 1/1999 | Chadbourne et al. | | |
| 5,911,604 | A * | 6/1999 | Chadbourne | H01R 4/2412 | 439/783 |
| 6,068,525 | A * | 5/2000 | De Keyser | H01R 4/5083 | 439/783 |
| 6,120,334 | A * | 9/2000 | Timsit | H01R 4/2412 | 439/783 |
| 6,152,786 | A * | 11/2000 | Perrin | H01R 4/5083 | 439/417 |
| 6,309,261 | B1 * | 10/2001 | Chadbourne | H01R 4/5083 | 439/783 |

(Continued)

*Primary Examiner* — William H. Mayo, III

(74) *Attorney, Agent, or Firm* — Robinson + Cole LLP

(57) ABSTRACT

An electrical connector includes a clamp body having a substantially C-shaped configuration defining an interior cavity. A wedge is configured to be inserted into the clamp body. The wedge has a wedge body defining a conductor channel and a plurality of fins extending from the wedge body into the conductor channel. The plurality of fins is oriented to pierce an insulation layer of a conductor when the wedge is inserted into a clamp body.

21 Claims, 4 Drawing Sheets

(56) References Cited

U.S. PATENT DOCUMENTS

| | | | | |
|---|---|---|---|---|
| 6,322,402 | B1 * | 11/2001 | Chadbourne ........ | H01R 4/2412 439/783 |
| 6,979,236 | B1 | 12/2005 | Stanton | |
| 8,002,592 | B2 | 8/2011 | Crutcher et al. | |

* cited by examiner

INSULATION PIERCING WEDGE CONNECTOR

RELATED APPLICATION(S)

This application is a continuation of U.S. Non-Provisional application Ser. No. 17/684,934, filed Mar. 2, 2022, which is based on U.S. Provisional Application Ser. No. 63/155,431, filed Mar. 2, 2021, the disclosure of which is incorporated herein by reference in its entirety and to which priority is claimed.

FIELD

Aspects of the disclosure are directed to connector assemblies used to mechanically and electrically connect tap lines or cables to overhead electrical transmission or distribution lines.

BACKGROUND

Bare conductors have historically been popular for overhead distribution and sub-transmission applications because they are more economically feasible, are easier to work with, and are more practical. Various connectors, such as splice or dead-end connectors, are used for connecting such conductors to existing support structures, such as poles and guide wires in overhead distribution lines.

One type of connector includes a wedge and a body for receiving a pair of conductors and a wedge placed inside the body to hold the conductors in place. FIG. 1 shows an exploded perspective view of a conventional electrical wedge connector 10 and two electrical conductors A, B. The electrical wedge connector 10 generally comprises a clamp body 12 and a wedge 14. The wedge 14 is inserted into the body 12 between conductors A, B. The wedge/tapered shape of the body 12 and the wedge member 14 provides for the body 12 and the wedge 14 to be removably connected to each other as they are fastened together in a press fit or interference fit configuration. The conductors A, B are thus captured in body 12 by wedge 14 thereby connecting the conductors A, B to each other.

The body 12 of the wedge connector 10 has a general "C" shape forming two conductor receiving channels 20, 22 at opposite top and bottom sides of the body 12. The body 12 is tapered from a rear end 24 to a front end 26 to form a general wedge shape profile. Additionally, the conductor receiving channels (or conductor receiving areas) extend from the front end 26 to the rear end 24.

SUMMARY

According to certain aspects, an electrical connector includes a clamp body having a substantially C-shaped configuration defining an interior cavity. A wedge is configured to be inserted into the clamp body. The wedge has a wedge body defining a conductor channel and a plurality of fins extending from the wedge body into the conductor channel. The plurality of fins is oriented to pierce an insulation layer of a conductor when the wedge is inserted into a clamp body.

According to certain aspects, an electrical connector includes a clamp body defining an interior cavity for receiving a first conductor and a second conductor. A wedge is configured to be inserted into the clamp body. The wedge has a wedge body defining an upper conductor channel and a lower conductor channel. A first plurality of fins extend from the wedge body into the upper conductor channel. A second plurality of fins extend from the wedge body into the lower conductor channel. The first plurality of fins is oriented to pierce an insulation layer of the first conductor when the wedge is inserted into a clamp body and the second plurality of fins is oriented to pierce an insulation layer of the second conductor when the wedge is inserted into a clamp body.

Certain aspects are directed to a method of connecting a first conductor and a second conductor. A first conductor is positioned in a first section of a clamp. A second conductor is positioned in a second section of the clamp. A wedge is inserted into the clamp. The wedge has an upper channel for receiving the first conductor, a plurality of first fins extending into the upper channel, a lower channel for receiving the second conductor, and a plurality of second fins extending into the lower channel. The wedge is driven into the clamp so that the first fins pierce the first conductor and the second fins pierce the second conductor.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

With the increased frequency of natural disasters, damaged and downed utility lines are becoming increasingly problematic and can be the cause of severe wildfires. One way to prevent or mitigate such problems is the use of insulated cables as opposed to the traditional bare cables. The installation of electrical connectors on covered conductors, however, can be difficult. For example, the insulation layer of a conductor may need to be stripped in order to expose the bare electrical conductor for application of a connector, a tap, a splice, or termination. This can result in more work for the line mechanic and requires more time and tools. Time is extremely important, and the safety of the line mechanic is vital—more time up on a line increases the level of risk of injury. Various aspects of this disclosures are directed to devices that can be used by a utility line mechanic to install electrical connectors to an insulated cable without separately stripping the insulation and methods of using such devices.

Figure 1:
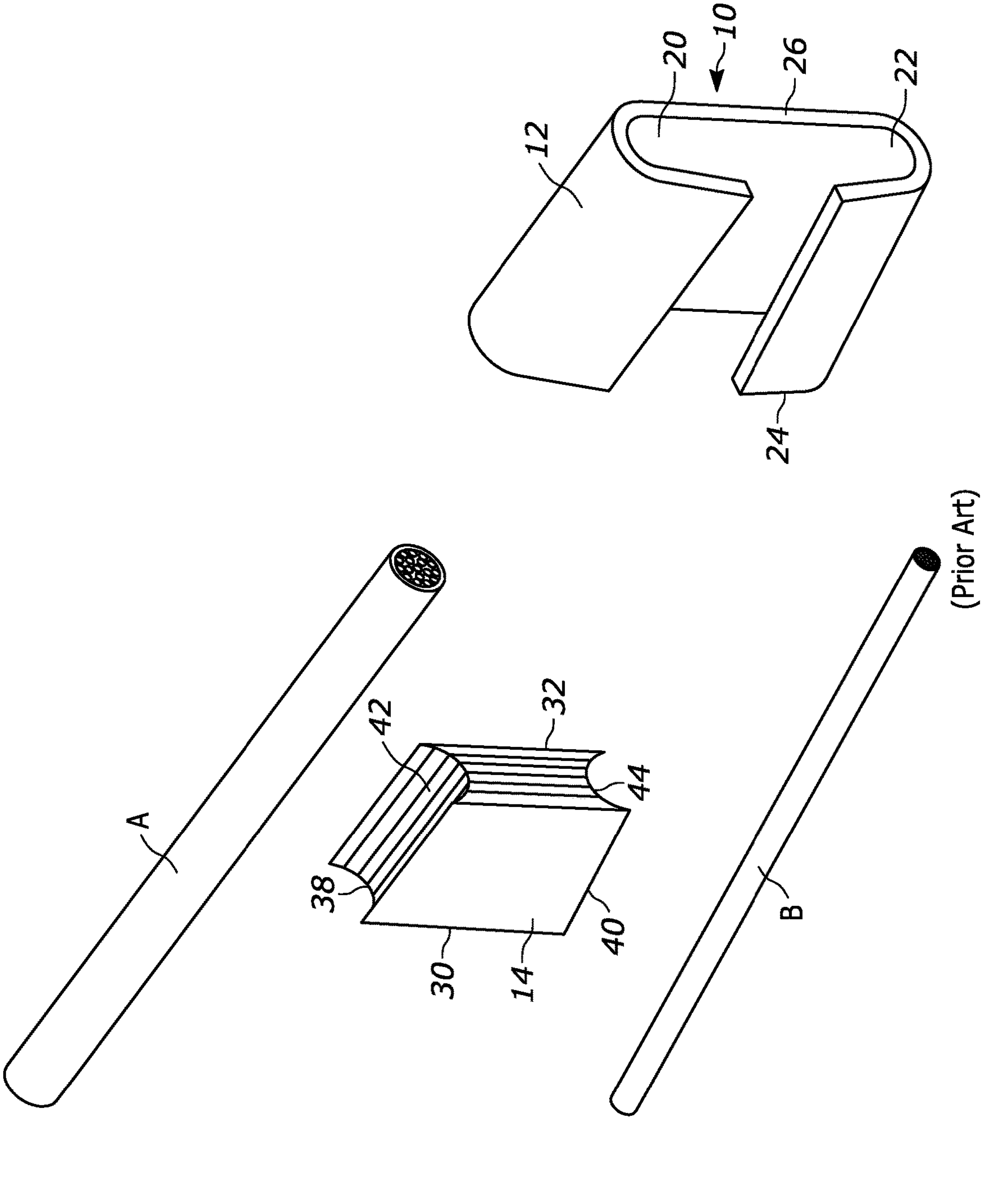
(Prior Art) FIG. 1
FIG. 1 is an exploded perspective view of a conventional electrical wedge connector
Figure 2:
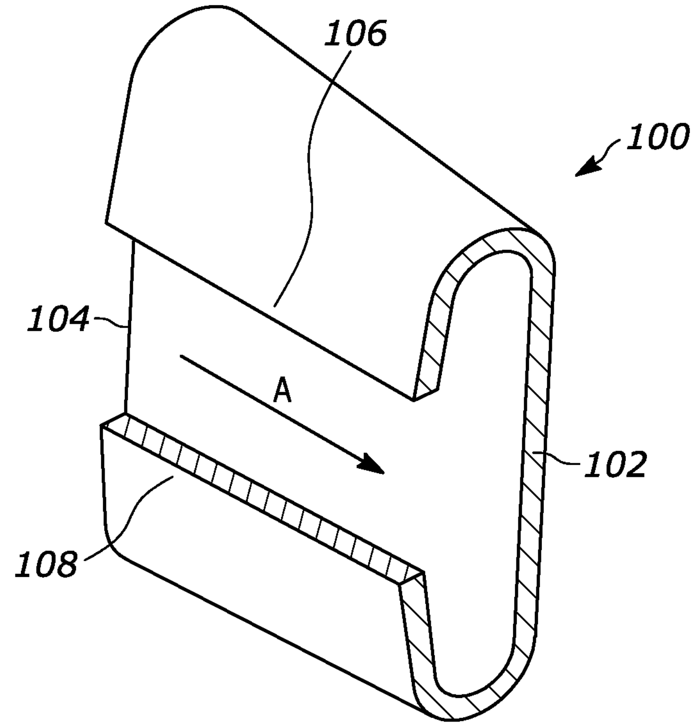
FIG. 2 is a side perspective view of a clamp body of a wedge connector.

FIG. 2 shows an example of a clamp body 100 that has a substantially C-shaped configuration defining a cavity for receiving a wedge. The clamp body includes a front edge 102 and a rear edge 104. The body tapers from the rear edge 104 toward the front edge 102. A first arm 106 and a second arm 108 wrap around a portion of the cavity. The first and second arm 106, 108 can each define a channel that can receive a conductor. In certain embodiments the ends of the arms 106, 108 are spaced from one another. The clamp body 100 is configured to receive a wedge in an insertion direction A from the rear edge 104 toward the front edge 102. In the illustrated configuration, the clamp body 100 is made from a single piece of material. Other configurations can utilize multiple pieces of material, as well as have different sizes and shapes.

Figure 3:
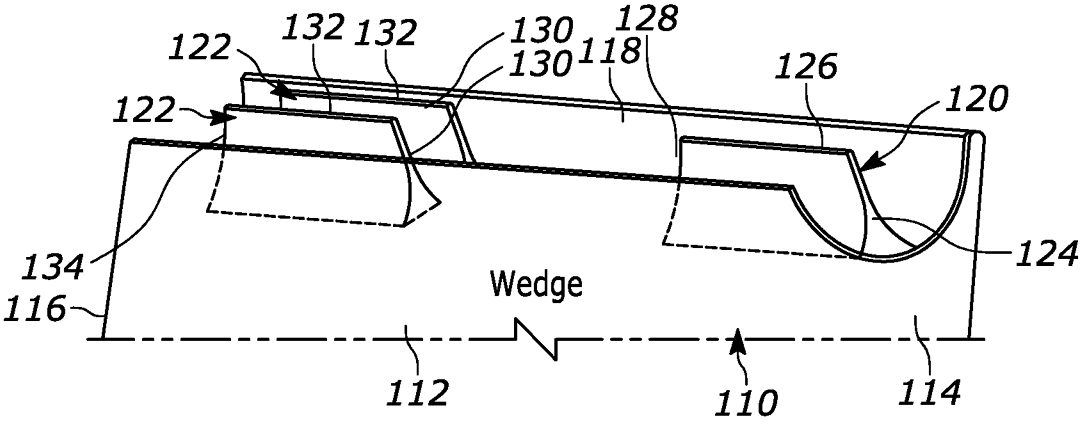
FIG. 3 is a side perspective view of a portion of a wedge having insulation piercing fins.
Figure 4:
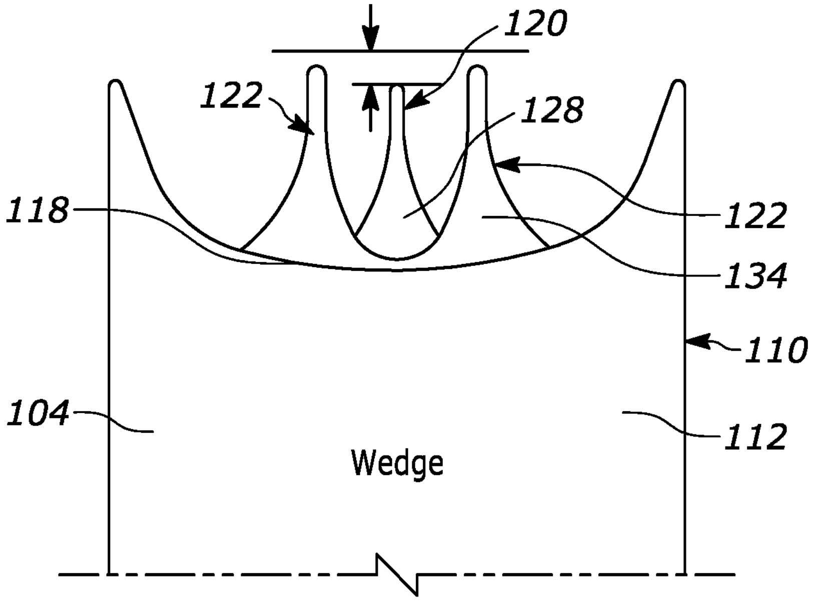
FIG. 4 is a rear view of the wedge of FIG. 3.
Figure 5:
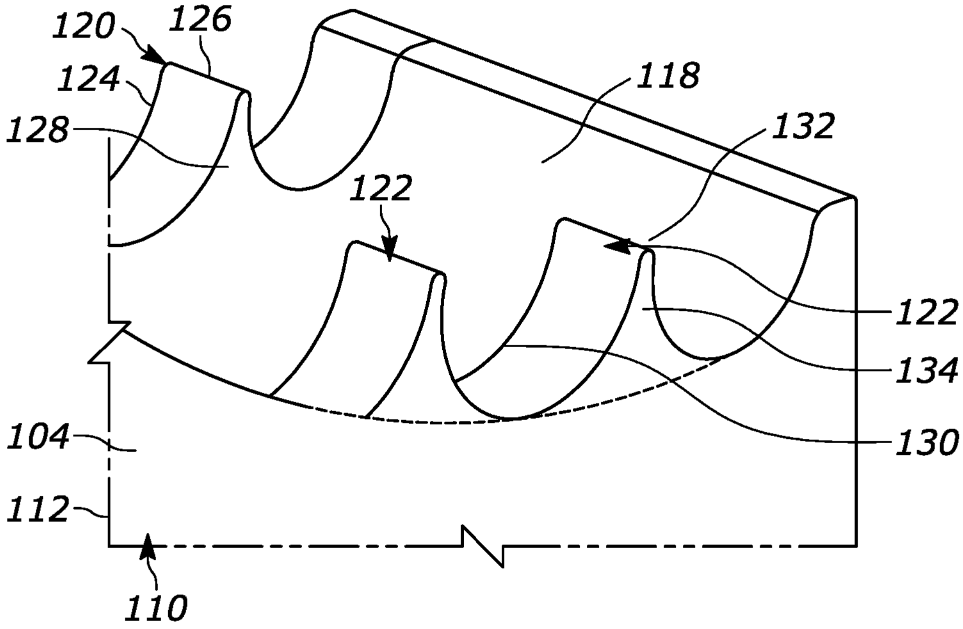
FIG. 5 is a rear perspective view of the wedge of FIG. 3.

FIGS. 3-5 show an example of an insulation piercing wedge 110 that can be used with the clamp body 100. Only an upper portion of the wedge 110 is shown, with the lower portion being a substantially mirror image thereof. The exemplary wedge 110 is made from a conductive material so that electrical current can be transmitted between a main line and a tap line. The term wedge is uses to connate the functional aspects of the device and is not limiting in the size and shape of the actual component.

The wedge 110 has a wedge body 112 with a front edge 114 and a rear edge 116. The wedge body 112 can taper from the rear edge 116 to the front edge 114. An upper conductor channel 118 is formed in the wedge body 112. The upper conductor channel 118 has a semi-circular configuration and is configured to receive an electrical conductor. The size and the shape of the upper conductor channel 118 can vary depending on the type of conductor to be received. The size and shape of the lower conductor channel (not shown) can also vary depending on the type of conductor to be received. In certain configurations, the upper conductor channel 118 can have a different size and shape from the lower conductor channel. This allows different sized tap conductors to be connected to a different sized main conductor.

One or more insulation piercing fins extend in the upper conductor channel 118. In the illustrated embodiment, three piercing fins are shown with a single front fin 120 and a pair of rear fins 122. The front fin 120 can be positioned in substantially the center of the upper channel 118 and the rear fins 122 can be positioned off-center on either side of the front fin 120. The front fin 120 includes a leading edge 124, an upper edge 126, and a trailing edge 128. The rear fins also includes a leading edge 130, an upper edge 132, and a trailing edge 134. The leading edges 124, 130 can be sloped, angled, or curved from the upper conductor channel 118 to the respective upper edges 126, 132. The trailing edges 128, 134 can be substantially vertically oriented and oriented substantially perpendicular to the upper edge 126. In certain configurations, the upper edge 126 of the front fin 120 is positioned lower than the upper edge 132 of the rear fins 122, as best shown in FIG. 4. In the illustrated embodiment, the fins 120, 122 are unitality formed with the wedge boy 112.

Other configurations of fins can be used. Different sizes, shapes, angles, number of front and rear fins, and position of fins can be used. Some configurations can utilize fins that are separately formed from the wedge. These discrete fins can be removably connected to the wedge body 112 or integrally connected to the wedge body 112, for example through a joining process such as welding. In some configurations, the fins can be placed on the clamp body 102 instead of the wedge body 112.

Figure 6:
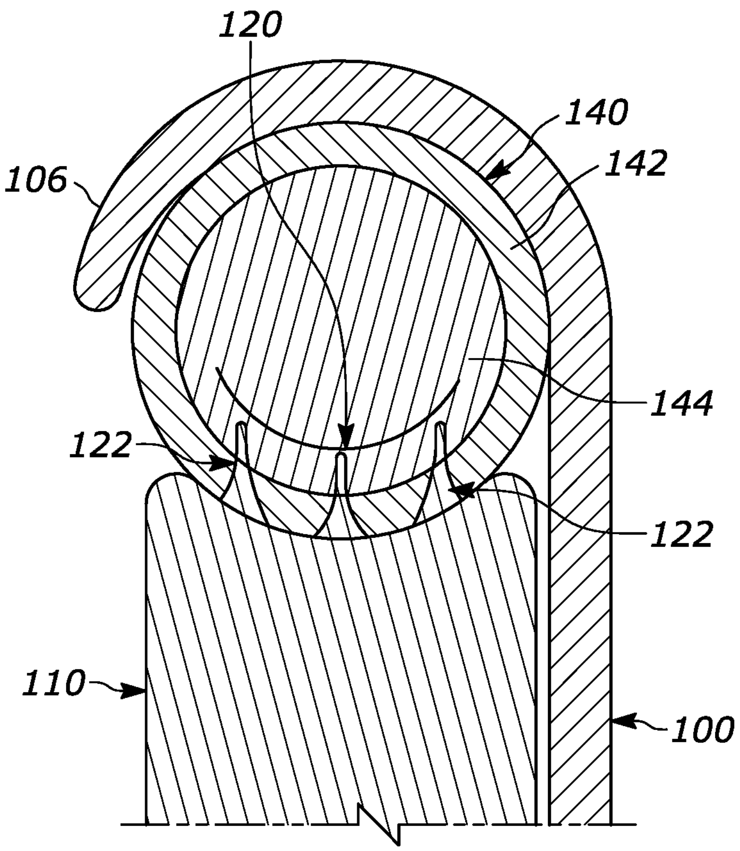
FIG. 6 is a rear view of the wedge connector engaging a conductor.
Figure 7:
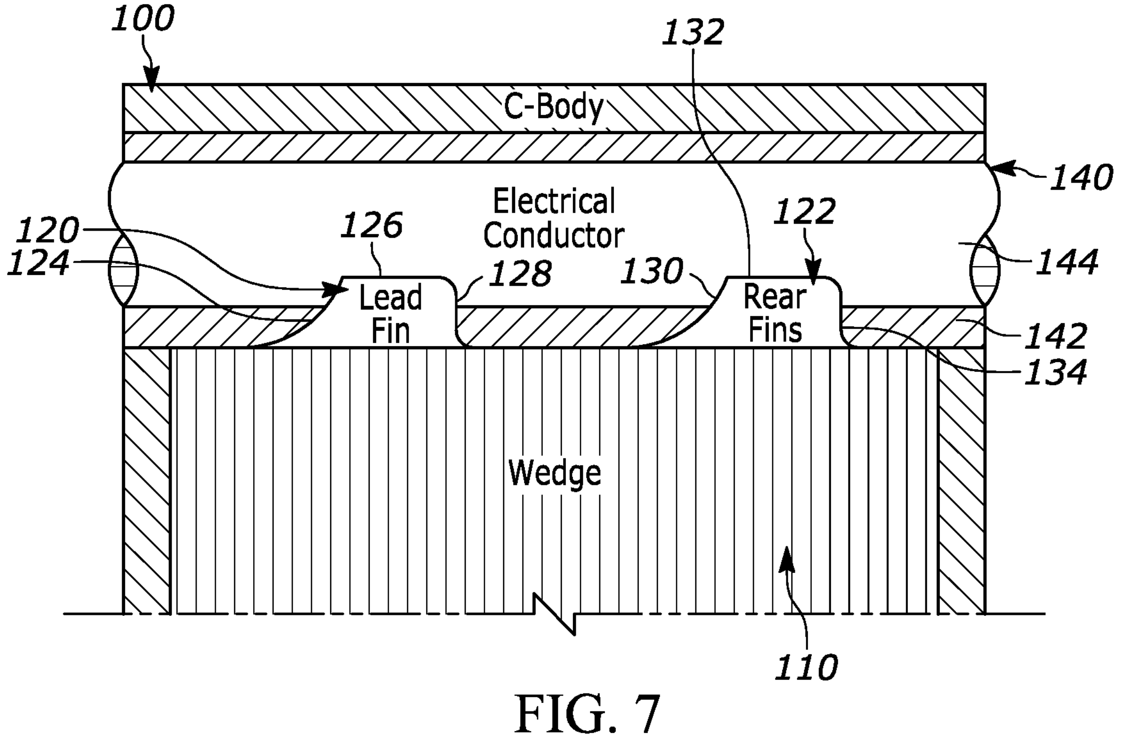
FIG. 7 is a side, sectional view of FIG. 6.

FIGS. 6 and 7 show the clamp 100 and insulation piercing wedge 110 in use with a conductor 140 having an insulation layer 142 and a conductive portion 144. The conductor 140 can be loaded in the cavity defined by the clamp body 102, and the wedge 110 can be aligned with the cavity. The wedge 110 can be driven into the clamp 100, for example using a fired-on driving means such as the BURNDY WEJTAP tool, or using other powered or manually operated tools. Certain configurations can utilize a driving bolt that extends through the wedge body 112 and connects to the clamp 100, where rotation of the bolt drives the wedge body 112 into the clamp 100.

As the wedge 110 is driven into the clamp 100, the fins 120, 122 will pierce the insulation layer 142, making contact with the conductive portion 144. The position and height of the fins 120, 122 allows for piercing of the insulation 142 and the conductive portion 144 at different times in the installation process and at different locations along the circumference and length of the conductor 140. This can help ensure adequate electrical contact is made with the conductor 140. The front and rear fins 120, 122 are shown adequately seated within the electrically conductive portion 144 of the conductor 140, and the radius of the wedge upper conductor channel 118 fully seated on the conductor 140. The orientation of the leading edges 124, 130 and sharpness of the fins can also help ensure more efficient piercing of the fins 120, 122 into the insulation 142 and conductor 140. The fins 120, 122 are designed such that their leading edge is sharp enough to slice into the conductor insulation 142 in a gradual way as the wedge 110 is driven into place. This helps to reduce the surface area being sliced and therefore provides a higher contact force to facilitate the slicing, or cutting, of the covering.

The foregoing detailed description of the certain exemplary embodiments is provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. An electrical connector comprising:

a clamp body having a substantially C-shaped configuration defining an interior cavity;

a wedge configured to be inserted into the clamp body, the wedge having a wedge body defining a conductor channel that extends along a channel axis and a plurality of fins extending from the wedge body into the conductor channel, wherein each fin of the plurality of fins is unitarily formed with the wedge body;

wherein the plurality of fins includes a front fin, a first rear fin, and a second rear fin, wherein the rear fins are offset from the front fins in an offset direction perpendicular to an insertion direction of the wedge and to the channel axis;

wherein the plurality of fins is oriented to pierce an insulation layer of a conductor when the wedge is inserted into a clamp body;

wherein each of the fins includes a leading edge, an upper edge, and a trailing edge, and wherein the leading edge is curved; and wherein the upper edge extends between the leading edge and the trailing edge along the channel axis of the conductor channel.

2. The electrical connector of claim 1, wherein an upper edge of the front fin is positioned below and upper edge of the rear fins.

3. The electrical connector of claim 1, wherein the clamp body includes a first arm and a second arm, and wherein the first arm forms a first channel for receiving a conductor and the second arm forms a second channel for receiving a second conductor.

4. The electrical connector of claim 3, wherein the first channel has a first width equal to a second width of the second channel, and wherein the first channel and the second channel have a semi-circular shape.

5. The electrical connector of claim 1, wherein each fin of the plurality of fins includes a side surface extending between the leading edge and the trailing edge, and wherein the side surface forms a substantially smooth curve with the conductor channel.

6. The electrical connector of claim 1, wherein the clamp body tapers from the rear edge to the front edge.

7. The electrical connector of claim 1, wherein the trailing edge of each of the fins is substantially perpendicular to the upper edge and to the channel axis.

8. An electrical connector comprising:

a clamp body having a substantially C-shaped configuration defining an interior cavity;

a wedge configured to be inserted into the clamp body, the wedge having a wedge body defining a conductor channel and a plurality of fins extending from the wedge body into the conductor channel, wherein each of the fins includes a leading edge, an upper edge, and a trailing edge;

wherein each fin of the plurality of fins includes a side surface extending between the leading edge and the trailing edge, and wherein the side surface forms a substantially smooth curve with the conductor channel; and wherein the plurality of fins is oriented to pierce an insulation layer of a conductor when the wedge is inserted into a clamp body.

9. The electrical connector of claim 8, wherein:

wherein the plurality of fins includes a front fin, a first rear fin, and a second rear fin;

wherein the rear fins are offset from the front fins in a direction perpendicular to an insertion direction of the wedge; and wherein the rear fins are offset from the front fins in a direction parallel to the insertion direction of the wedge.

10. The electrical connector of claim 8, wherein the clamp body includes a first arm and a second arm, and wherein the first arm forms a first channel for receiving a conductor and the second arm forms a second channel for receiving a second conductor.

11. The electrical connector of claim 10, wherein the first channel has a first width equal to a second width of the second channel, and wherein the first channel and the second channel have a semi-circular shape.

12. The electrical connector of claim 8, wherein an upper edge of the front fin is positioned below an upper edge of the rear fins.

13. The electrical connector of claim 8, wherein each fin of the plurality of fins is unitarily formed with the wedge body.

14. The electrical connector of claim 8, wherein the clamp body includes a front edge and a rear edge, and the clamp body tapers from the rear edge to the front edge.

15. The electrical connector of claim 8, wherein the conductor channel extends along an axis and the wedge includes a first edge and a second edge parallel to the axis, and wherein the substantially smooth extends entirely between the side surface of each fin and one of the first edge and the second edge.

16. A method of connecting a first connecting a first conductor and a second conductor comprising:

positioning a first conductor in a first section of a clamp;

positioning a second conductor in a second section of the clamp;

inserting a wedge into the clamp, the wedge having an upper channel for receiving the first conductor, a plurality of first fins extending into the upper channel, a lower channel for receiving the second conductor, and a plurality of second fins extending into the lower channel, wherein each of the fins includes a leading edge, an upper edge, and a trailing edge, and wherein each fin of the plurality of fins includes a side surface extending between the leading edge and the trailing edge, and wherein the side surface forms a substantially smooth curve with the conductor channel;

driving the wedge into the clamp so that the first fins pierce the first conductor and the second fins pierce the second conductor.

17. The method of claim 16, wherein the first conductor includes an insulation layer surrounding a conductive layer, and wherein driving the wedge into the clamp pierces the insulation layer so the first fins contact the conductive layer.

18. The method of claim 16, wherein the clamp body tapers from a rear edge to a front edge and the wedge is inserted from the rear of the clamp body and driven toward the front edge.

19. The method of claim 16, wherein the plurality of fins includes a front fin, a first rear fin, and a second rear fin, wherein the rear fins are offset from the front fin in a direction perpendicular to an insertion direction of the wedge, the method further comprising orienting the wedge so that the front fin is proximate to the clamp so that the front fin enters the clamp before the rear fins.

20. The method of claim 16, wherein each fin of the plurality of fins is unitarily formed with the wedge body.

21. The method of claim 16, wherein the claim has a C-shaped configuration.

* * * * *